United States Patent [19]

Yurgevich

[11] Patent Number: 4,844,672

[45] Date of Patent: Jul. 4, 1989

[54] INTERLOCKING ADAPTER CASTING

[75] Inventor: Howard J. Yurgevich, Lafayette, Ind.

[73] Assignee: Rosby Corporation, Monon, Ind.

[21] Appl. No.: 183,940

[22] Filed: Apr. 20, 1988

[51] Int. Cl.[4] .............................................. B65D 90/12
[52] U.S. Cl. ........................................ 410/54; 410/77; 410/84; 220/1.5
[58] Field of Search ........................ 410/44, 52, 54, 55, 410/68, 70, 77–82, 84; 220/1.5; 206/206, 386, 599, 503; 108/54.1; 24/287

[56] References Cited

U.S. PATENT DOCUMENTS

| 3,980,185 | 9/1976 | Cain | 410/77 X |
| 4,071,274 | 1/1978 | Dalton et al. | 410/84 X |
| 4,430,032 | 2/1984 | Morgan | 410/80 X |

OTHER PUBLICATIONS

Copy of two commercial brochures of products by George Blair PLC: (a) "Piggi-Lok" Chassis Twistlock—Type BLR 624, (b) Stacklock with Integral Twistlock—Type BLR 1214.

Primary Examiner—Robert B. Reeves
Assistant Examiner—Dean J. Kramer
Attorney, Agent, or Firm—Barnes & Thornburg

[57] ABSTRACT

A wide-body shipping container is adapted for engagement with standard width container supports mounted on various types of carriers by providing a plurality of adapters movably mounted with respect to supporting points on the bottom of the wide-body containers. Each adapter is movable to a position below the container supporting point and engageable therewith in such a manner as to define a new supporting structure spaced laterally inward from the outer most surface of the wide body shipping container so as to permit coupling of the container to a standard width container support.

18 Claims, 2 Drawing Sheets

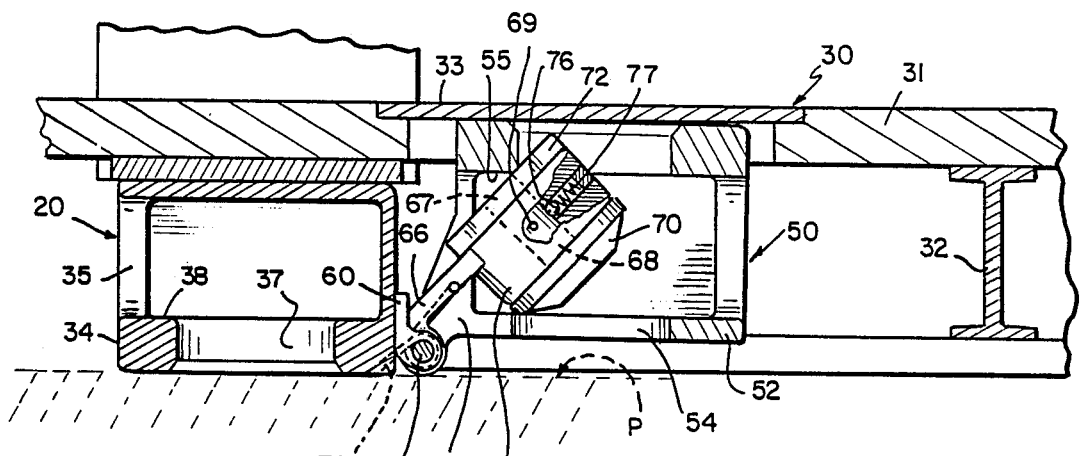
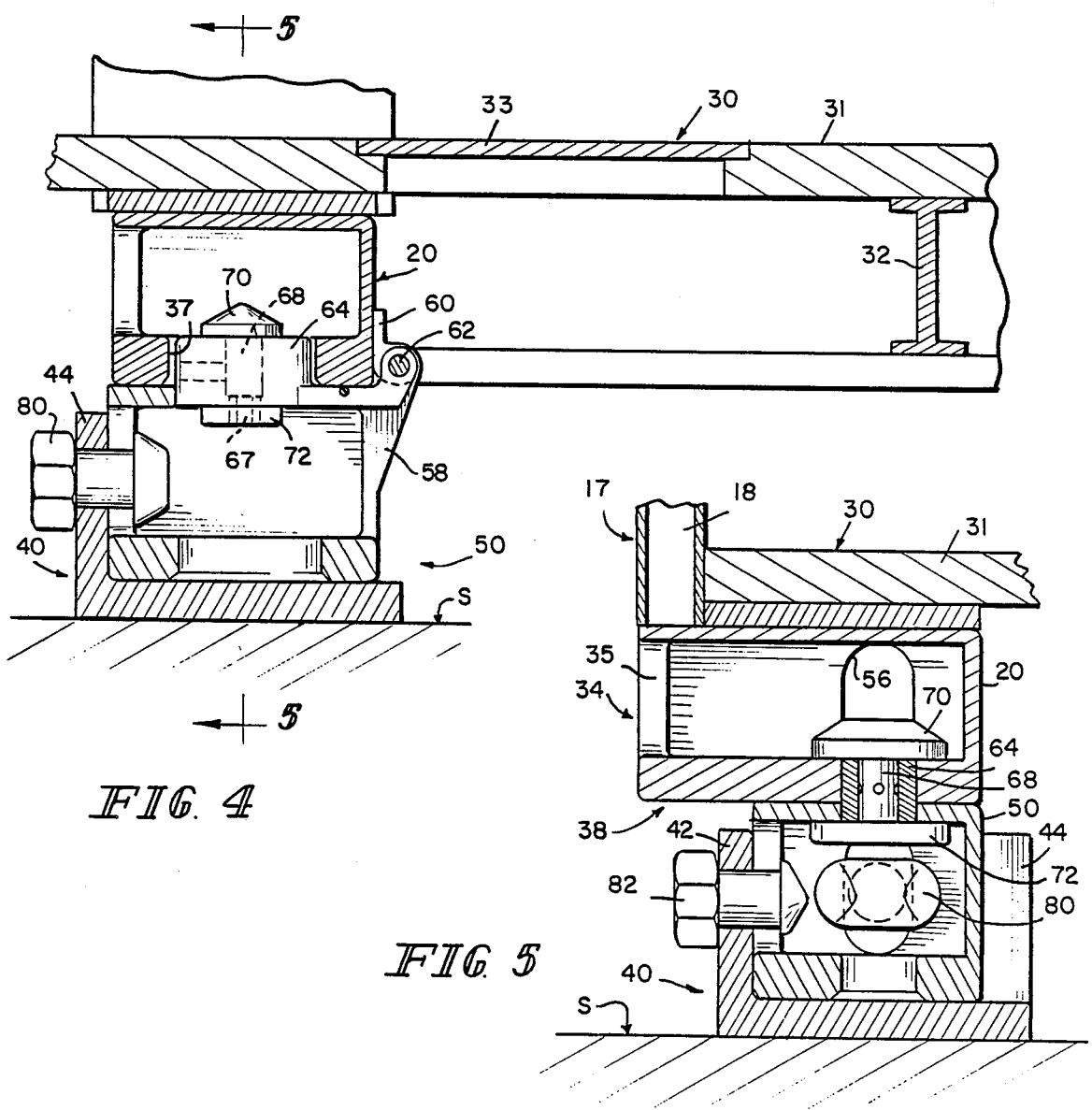

INTERLOCKING ADAPTER CASTING

BACKGROUND OF THE INVENTION

This invention relates generally to containers for freight which are intended for use on various types of carriers including rail car, motor carrier trailer, and marine transport. Such freight containers have over the years acquired certain standard dimensions and structural features so as to permit the handling and stacking of such containers. This invention particularly relates to new wide-body shipping containers having an outside width approximately six inches greater than the previous standard container width and an adapter which will permit such wide-body shipping containers to be coupled to standard width container supporting devices on railroad cars and the like.

In the past, a large number of containers have been constructed generally in accordance with Tantlinger, U.S. Pat. No. 3,085,707 and Bodenheimer, U.S. Pat. No. 3,646,609. Such containers, through the standardization of the position of certain structural points, have achieved wide acceptance and can readily be used in conjunction with other similar containers regardless of overall container length. Containers of this general class have been standardized to have an outside width of ninety-six inches. This width dimension was adopted principally due to regulations on the maximum allowable width for highway truck-trailers. With this dimension so standardized, there has developed a relatively large body of existing truck-trailer chassis, railway flat cars, barges, and ships, having container supports which are specifically adapted for containers of ninety-six inches in width.

In recent years, various regulations concerning highway truck-trailers have been updated including regulations which now permit the use of trailers of even greater width dimension. The increase in width dimension of the trailer is directly translated to increased volume capacity for the trailer and hence is viewed as highly desirable by the industry. Freight containers also having the increased width are, for the same reasons, desirable but present a significant problem in that the support points of the containers are not situated at the previously standardized width. It is therefore necessary to adapt such wide-body shipping containers for engagement with standard-width container supports.

SUMMARY OF THE INVENTION

In accordance with the present invention, a wide-body shipping container is adapted for engagement with standard-width container supports by providing a plurality of adapters movably mounted with respect to supporting points on the bottom of the wide-body containers. Each adapter is moveable to a position below the container supporting point and engageable therewith in such a manner as to define a new supporting structure spaced laterally inwardly from the outer most surface of the wide-body shipping container so as to permit coupling of the container to a standard-width container support.

Generally, each adapter in accordance with the present invention comprises an enclosure, means pivotally mounting the enclosure to a wide-body container so as to permit deployment of the adapter below the container, means for lockingly engaging the enclosure below the container, and means for permitting the enclosure to be engaged by a container support.

In the preferred embodiment, the adapter of the present invention is a generally rectangular casting having a plurality of apertures. Mounting means is provided for moveably mounting the casting to a wide-body container so as to permit deployment of the adapter below the container at a position slightly inside the lateral outer most wall of the wide-body container. A bearing is moveably coupled to the casting which carries a rod having an elongated head forming a twistlock adapted to pass through one of the apertures in the casting to engage a lower most surface of the container. Means is provided for biasing the bearing toward a position wholly within the casting and to retract the casting to a non-deployed position when the twistlock is disengaged from the coupling member on the bottom of the shipping container.

One feature of the present invention is a wide-body shipping container which is adapted for engagement with either standard width or wide-body width supports. Such a shipping container can be advantageously employed on highway truck-trailer chassis, railway flat cars, or the like which are specifically designed for standard-width containers.

Another feature of the present invention is an adapter for adapting a wide-body container so as to be supported upon a set of standard-width container supports. The adapter can advantageously be added to existing wide-body containers with only the minimum of modification. The capital cost of providing such adapters for wide-body containers is believed to be small as compared to the capital expenditure required for the total modification or replacement of all rolling stock used in the handling of such containers.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures.

BRIEF DESCRIPTION OF THE DRAWINGS

FIG. 3 is a sectional view taken along lines 3—3 of FIG. 1.

FIG. 4 is a sectional view similar to FIG. 3 but with the adapter casting pivoted into position so as to cooperate with the underlying supports such as that shown in FIG. 1.

FIG. 5 is a sectional view taken along lines 5—5 of FIG. 4.

DESCRIPTION OF THE PREFERRED EMBODIMENT

Figure 1:
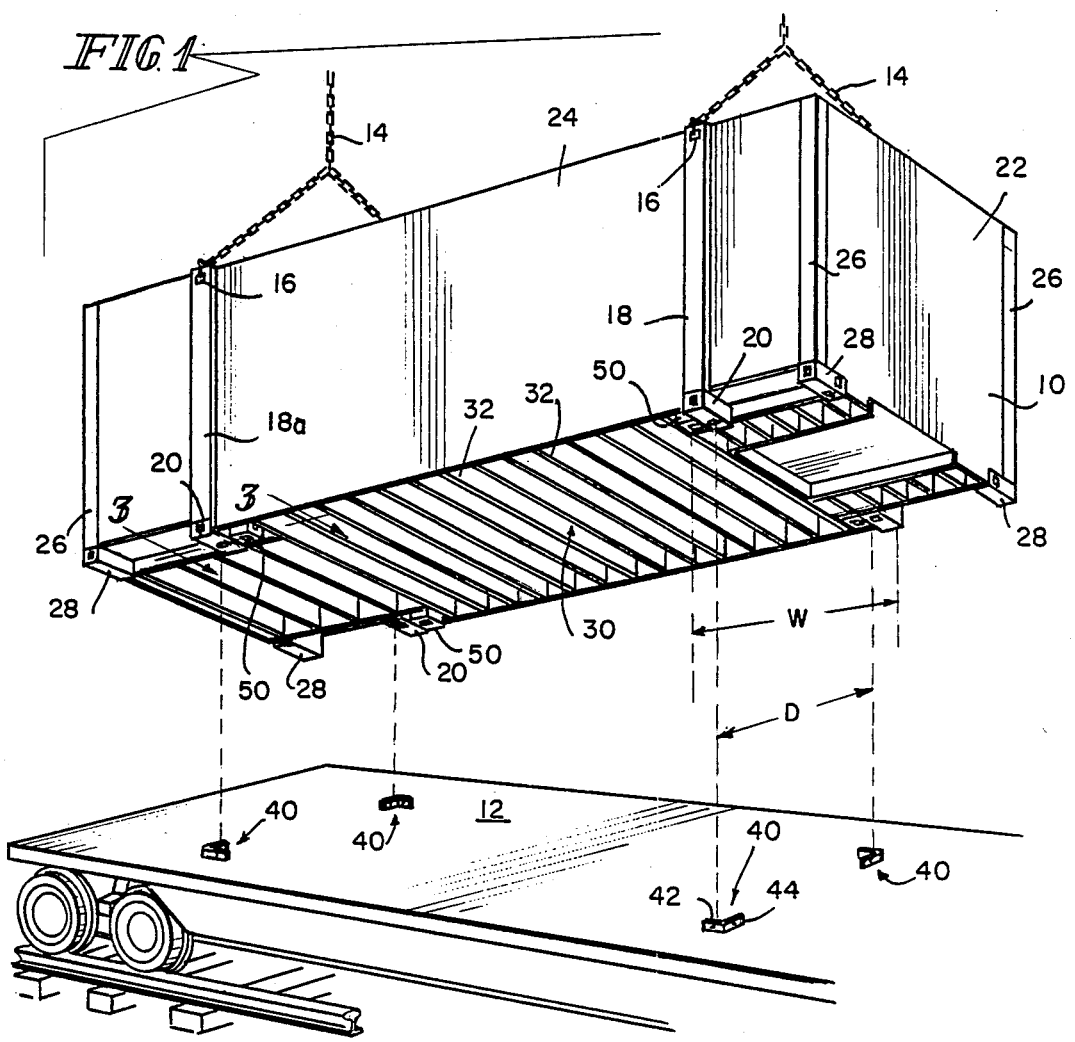
FIG. 1 is a perspective view showing a wide-body shipping container in accordance with the present invention adapted for engagement with standard-width container supports located on a rail-car.

A wide-body shipping container 10 is shown suspended above a railroad car 12 by means of chains 14 of a hoisting device (not shown). The chains 14 are shown to engage openings 16 in the upper ends of support posts 18. These support posts 18 of container 10 are disposed so as to form a uniformly spaced frame means intended to cooperate with other containers of the same or different length during shipment. The frame means also provides for convenient handling of the container as illustrated in FIG. 1. The outside surface of the support posts 18 are generally situated at the maximum allowable outside dimension for the wide-body container W. Coupling members 20 are provided at the lower end of support posts 18 for coupling the container 10 either to other frame means on other containers, or to container supports on rolling stock such as railroad car 12, highway truck-trailer chassis, barges, or ships (not illustrated).

The container 10 is seen to include end walls 22 and side walls 24 joined at the corner by corner posts 26. Coupling members 28 are provided at the lower end of corner post 26 which are similar to coupling members 20. The bottom surface of the coupling members 20 and 28 are generally coplanar. A floor 30 of the container is defined by a plurality of cross members 32 supporting a layer of wood or other material (not shown).

The railroad car 12 is shown to include four container supports 40. The container supports 40 are intended to ensure that the container 10 is maintained in a fixed position with respect to the car 12 when mounted thereon. While the container supports 40 may vary somewhat in design, they generally comprise a pair of upstanding walls 42 and 44 arranged at right angles to each other for capturing a corner of a shipping container coupling member 20 or similar structure. While in certain circumstances the container supports 40 are longitudinally moveable with respect to car 12, they are generally not moveable in the width dimension W and instead are positioned at a fixed dimension D. It will be appreciated that where the distance D between the outer walls 42 of container supports 40 is less than the outer dimension W of coupling members 20, it is not possible to situate the container 10 within the corners defined by the container supports 40 without providing some adaptive means.

In accordance with the present invention, four adapters 50 are provided to permit the wide-body container 10 to be coupled to the container supports 40 which are situated at the standard width D.

Figure 2:
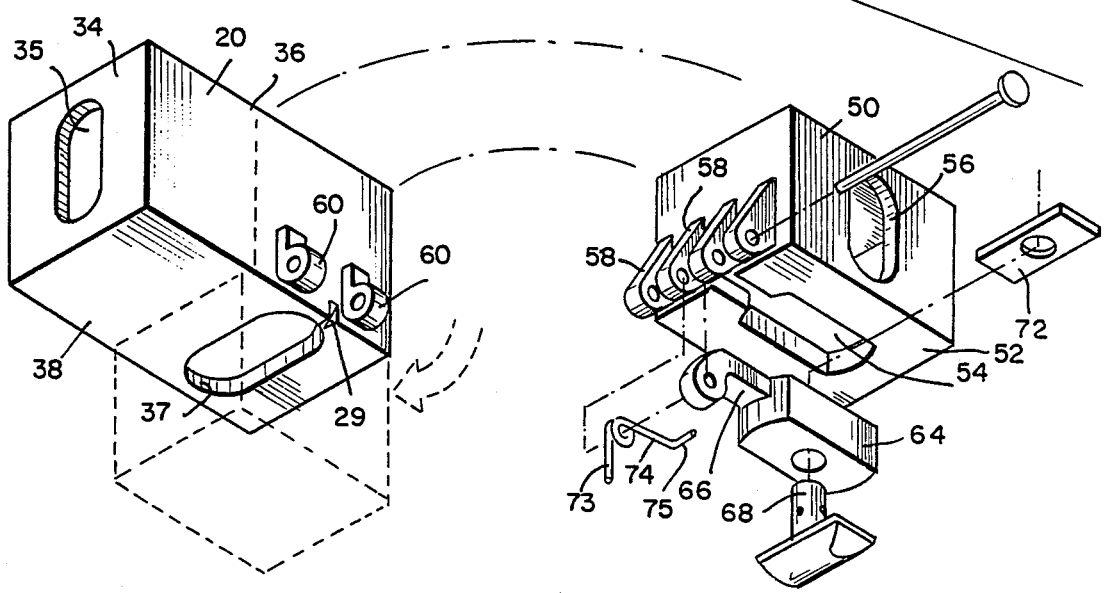
FIG. 2 is an exploded view of a coupling member of a wide-body shipping container and an adapter in accordance with the present invention.

FIG. 2 is an enlarged and exploded view of the coupling member 20 and adapter 50 at the bottom of support post 18a. The coupling member 20 includes a laterally outer side 34 forward or rearward side 36 and a lower surface 38. The coupling member 20 is generally a hollow cast steel member having apertures 35 and 37 for engaging various supporting and retaining structures in accordance with the general aims of containers of this class. Additional apertures can be provided in the casting as may be necessary to ensure for the cooperative connection between container 10 and the structures and facilities with which the containers are to be employed.

The adapter 50 is shown to comprise a generally rectangular casting 52 having apertures 54 and 56. The adapter 50 includes a plurality of projections 58 which together form a first pivot defining means. A second pivot defining means is provided by attachment lugs 60 which are welded to a forward or rearward wall 36 of coupling member 20. The attachment lugs 60 and projections 58 each include a hole for receiving hinge pin 62 which pivotally engages the adapter 50 to the coupling member 20.

The adapter 50 further includes a bearing 64 which is shown to include an arm 66 with a hole for receiving hinge pin 62. The bearing 64 supports rod 68 having an elongated head 70 forming a twistlock which is configured to be inserted into aperture 37 in the lower surface 38 of coupling member. Elongated element 72 is fixed to the opposite end of rod 68 in a spaced parallel relation such that plate 72 can be retained within adapter 50 while elongated element 70 is captured within coupling member 20. A biasing spring 74 is also engaged by hinge pin 62 for biasing the various elements of the adapter 50 a hereinafter described.

In the sectional view of FIG. 1 shown in FIG. 3, the floor 30 of the container 10 is shown to include a wooden layer 31 supported by cross members 32. It will be noted that the lower surface 38 of coupling member 20 is situated slightly below the lower most projection of cross member 32 so as to define a plane P upon which the container 10 would ordinarily rest in the absence of the use of the adapters 50. The adapters are shown pivoted to a non-deployed position above the plane P defined by the coupling member lower surface 38. The adapter 50 is biased toward this position by virtue of the spring 74 acting about pivot pin 62 to rotate bearing 64 to the position shown in FIG. 3. A first end 73 of spring 74 is shown to engage slot 29 on coupling member 20. The opposite L-shaped end 75 of spring 74 engages arm 66 and bearing 64 to bias bearing 64 toward a position wholly within the adapter 50 as shown if FIG. 3. As such, elongated member 72 contacts and inner portion of wall 55 of the adapter 50 causing the adapter to be rotated about pin 62 to the position shown in FIG. 3. It is to be noted that a portion of floor 30 includes metal plate 33 as a substitute for wood portion 31 to provide sufficient room for adapter 50.

In the manner of known twistlock devices, the rod 68 within bearing 64 is shown to include a detent 69. The detent is acted upon by ball 76 which is biased by spring 77 toward engagement with rod 68 within bearing 64 for retaining the rod 68 at selected angular positions within the bearing so as to ensure that the elongated head 70, once engaged in aperture 37, will not rotate due to shipping vibration or the like. Elongated head 70 and rod 68 can be rotated either through the manual manipulation of elongated member 72, or with the aid of an appropriate tool such as an Allen wrench inserted in hole 67 in the end of rod 68 opposite elongated head 70, or other equivalent means.

FIG. 4 shows the adapter 50 rotated to a deployed position below the coupling member 20 against the force of the biasing spring 74. It will be noted that elongated head 70 on the end of rod 68 has been rotated within slot 37 of coupling member 20 to a position such that a ball 76 now engages detent 69 to retain rod 68 and related elements at this pre-selected orientation. This action assures that the adapter 50 will not become prematurely disengaged from coupling member 20.

The adapter 50 is shown coupled to a front or rear wall 44 of container support 40 by means of another standard twist-lock 80. Such a twist lock is optional but may be employed to better stabilize the container 10 with respect to the rail car or other underlying supporting surface S.

FIG. 5 is a sectional view normal to that section in FIG. 4 and shows a vertical support 18 of container 10 including the outside surface 17 which is generally coplanar with the laterally outer side 34 of coupling member 20. The adapter 50 is shown in deployed position below the coupling member 20 and coupled thereto by the interlocking structure 64, 68, 70, and 72. The adapter 50 is shown to be captured in the corner defined by the upstanding walls 42 and 44 of container support 40. Twistlocks 80 and 82 secure adapter 50 in the container support 40 secured to underlying surface S. In this manner, the wide-body container having an outside wall generally coincident with surfaces 17 and 34 is successfully engaged within the standard width coupling member, the width being defined by the inside surface of upstanding wall or flange 42.

Although the invention has been described to detail with reference to the illustrated preferred embodiment, variations and modifications exist within the scope and spirit of the invention as described and defined in the following claims.

What is claimed is:

1. A wide-body shipping container adapted for engagement with standard-width container supports comprising:
    a body stackable with other bodies of the same or different length and width including vertically disposed and uniformly spaced frame means for supporting the body during shipment and handling, the frame means including an outer surface and coupling members at the lower ends thereof for coupling the body to other frame means and container supports, each coupling member comprising a laterally outer side generally coplanarly situated with the frame means outer surface, forward, rearward, and inner sides fixed to the outer side, and a lower surface fixed to the coupling member sides, and
    an adapter pivotally connected to one of the coupling member sides, movable to a position below the coupling member lower surface, and engageable therewith, the adapter having a laterally outer surface spaced inwardly from the coupling member outer side to permit coupling of the container to a standard-width container support.

2. The container of claim 1 wherein the adapter further includes an aperture in the laterally outer surface for receiving a locking engaging element of a container support.

3. The container of claim 1 wherein the adapter further includes means for coupling the adapter to the lower surface of the coupling member.

4. The container of claim 1 wherein the adapter further includes means for biasing the adapter to a position adjacent the coupling member.

5. The container of claim 1 wherein the adapter further includes means for biasing the adapter toward a position above the plane defined by the coupling member lower surface.

6. A wide-body shipping container adapted for engagement with standard-width container supports comprising:
    a body stackable with other bodies of the same or different length and width including four vertically disposed frame members for supporting the body during shipment and handling, each frame member including an outer surface and a coupling member at the lower end thereof for coupling the body to frame members of other containers and container supports, each coupling member comprising a generally rectangular fixture including a laterally outer side generally coplanarly situated with the frame member outer surface, forward, rearward, and inner sides fixed to the outer side, and a lower surface fixed to the coupling member sides, the the lower surface of the four coupling members defining a common plane, the container further comprising:
    four adapters, each adapter being pivotally connected to a side of one of the coupling members, movable to a position below the coupling member lower surface, and engageable therewith, the adapter having a laterally outer surface spaced inwardly from the coupling member outer side to permit coupling of the container to a standard-width container support.

7. The container of claim 6 wherein each adapter further comprises an aperture in the laterally outer surface for lockingly receiving an engaging element of a standard-width container support.

8. The container of claim 7 wherein each adapter further comprises means for coupling the adapter to the lower surface of the coupling member.

9. The container of claim 8 wherein each adapter further comprises means for biasing the coupling means toward a position wholly within the adapter.

10. The container of claim 9 wherein the biasing means acts to urge the adapter to pivot to a position adjacent the coupling member and above said common plane.

11. An adapter for adapting a wide-body container to be supported upon a set of container supports spaced at a pre-established standard width narrower than the width of the container, the adapter comprising:
    an enclosure, means for pivotally mounting the enclosure to a wide-body container so as to permit deployment of the adapter below the container, means for lockingly engaging the enclosure below the container, and means for permitting the enclosure to be engaged by a container support.

12. The adapter of claim 11 wherein the enclosure comprises a generally rectangular casting having a plurality of apertures.

13. The adapter of claim 11 wherein the pivotal mounting means comprises a first pivot-defining means fixed to the enclosure, a second pivot-defining means adapted to be fixed to the container, and pin means for engaging the first and second pivot-defining means to establish an axis about which the adapter may pivot.

14. The adapter of claim 11 wherein the means for lockingly engaging the enclosure below the container further comprises a bearing carrying a rod having an elongated head forming a twistlock, the bearing being movably coupled to the enclosure.

15. The adapter of claim 14 further comprising biasing means for biasing the bearing toward a position within the enclosure.

16. An adapter for adapting a wide-body container to be supported upon a set of container supports spaced at a pre-established standard width narrower than the width of the container, the adapter comprising:
    a generally rectangular casting having a plurality of apertures, mounting means for moveably mounting the casting to a wide-body container so as to permit deployment of the adapter below the container, a bearing movably coupled to the casting, a rod carried by the bearing, the rod having an elongated head forming a twistlock adapted to pass through one of the apertures in the casting, means for biasing the bearing toward a position wholly within the casting.

17. The adapter of claim 16 wherein the mounting means comprises a first pivot assembly unitary with the casting, a second pivot assembly adapted to be fixed to the container, and pin means for engaging the first and second pivot assemblies to define an axis about which the adapter may pivot.

18. The adapter of claim 17 wherein the bearing is movably coupled to the casting by the pin means, and wherein the biasing means is situated to act about the axis defined by the pin means.

* * * * *